March 21, 1933. C. P. DUBBS 1,901,950
APPARATUS FOR TREATING PETROLEUM AND OTHER HYDROCARBONS
Original Filed Dec. 30. 1922 4 Sheets-Sheet 1

Inventor
Carbon P. Dubbs
By Frank L. Belknap
Attorney

Patented Mar. 21, 1933

1,901,950

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

APPARATUS FOR TREATING PETROLEUM AND OTHER HYDROCARBONS

Continuation of application Serial No. 609,876, filed December 30, 1922, since abandoned, which in turn is a division of application Serial No. 176,588, filed June 23, 1917, now Patent No. 1,440,772, which in turn is a division of application Serial No. 133,527, filed November 27, 1916, now Patent No. 1,231,509. This application filed November 1, 1928. Serial No. 316,566.

This application is a continuation of my application Serial No. 609,876 filed December 30th, 1922 (since abandoned) which was a division of Serial No. 176,588 (on which Patent No. 1,440,772 was granted January 2, 1923) which was in turn a division of Serial No. 133,527, filed November 27, 1916 (on which Patent No. 1,231,509 was granted June 26, 1917).

This invention relates to an apparatus for treating petroleum, and other hydrocarbons to produce hydrocarbon products having lower boiling points than those treated.

The invention contemplates an apparatus whereby crude petroleum, petroleum distillates, petroleum residuum, or other like material can be placed in the apparatus and a gasoline-like product produced. Other objects of the invention are to provide apparatus in which the oil being treated is fractionally distilled and subjected to a cracking, breaking up, and polymerization process to convert heavier hydrocarbons or like substances into lighter, and then such changed or converted oil fractionally distilled as one uninterrupted process, and during such process passing the vapors and gases generated back through the liquid body and incidentally thereby reducing the amount of incondensible gases and unsaturated hydrocarbons; to provide an apparatus whereby more or less of the hydrocarbon treated can be converted into the product desired; to provide an apparatus wherein the heat units are utilized with the greatest efficiency; to provide an apparatus in which a series of stills and chambers are employed and in which the hydrocarbons treated are subjected to progressively increasing temperatures; to provide a construction in which the vapor and gases are subjected to progressively decreasing temperatures, the vapors and gases being preferably allowed to percolate up through the various chambers and stills, advancing from those having the higher temperatures to those having the lower temperatures; to provide an apparatus wherein the vapors, whether the condensable vapors or the incondensable gases, and the liquid are caused to contact with each other in the zones of reaction; to provide an apparatus which is facilitated by the use of pumps.

The invention also resides in such features of construction, as will more fully be hereinafter described.

In the drawings:

Figs. 1 and 1a are side elevations of an apparatus by which my method can be carried out.

Figs. 2 and 2a are top plan views of the constructions shown in Fig. 1.

Figure 1:
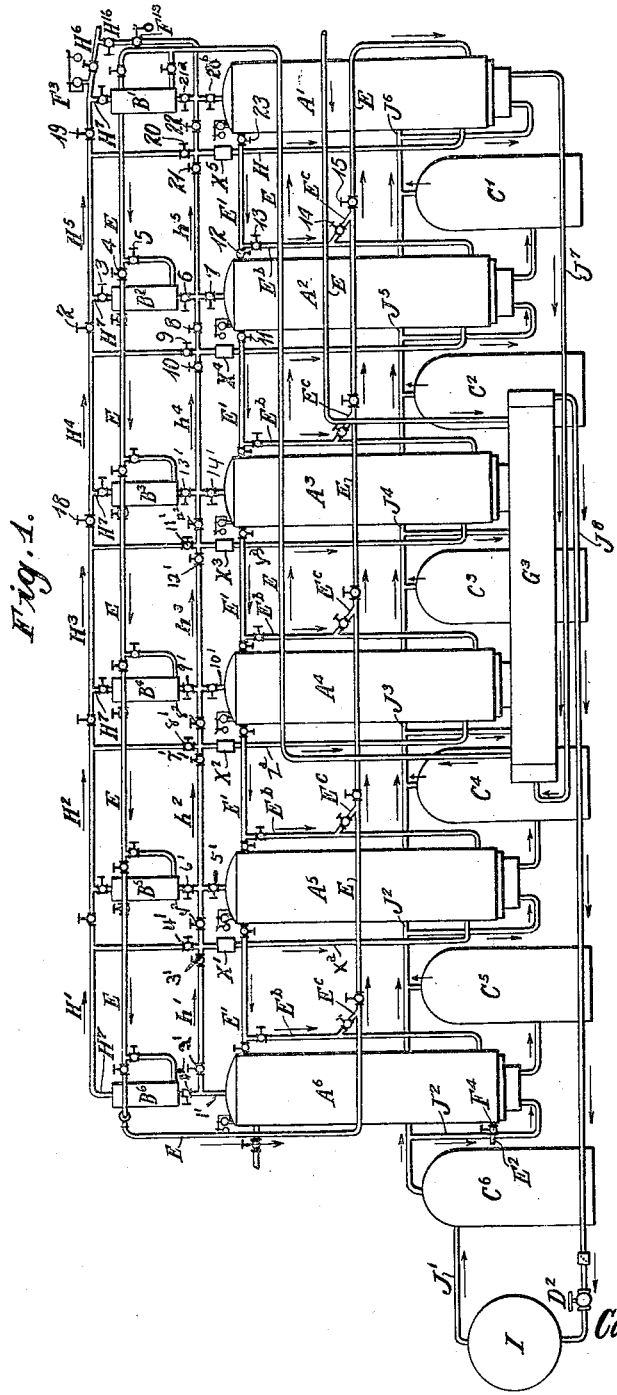
Figure 2:
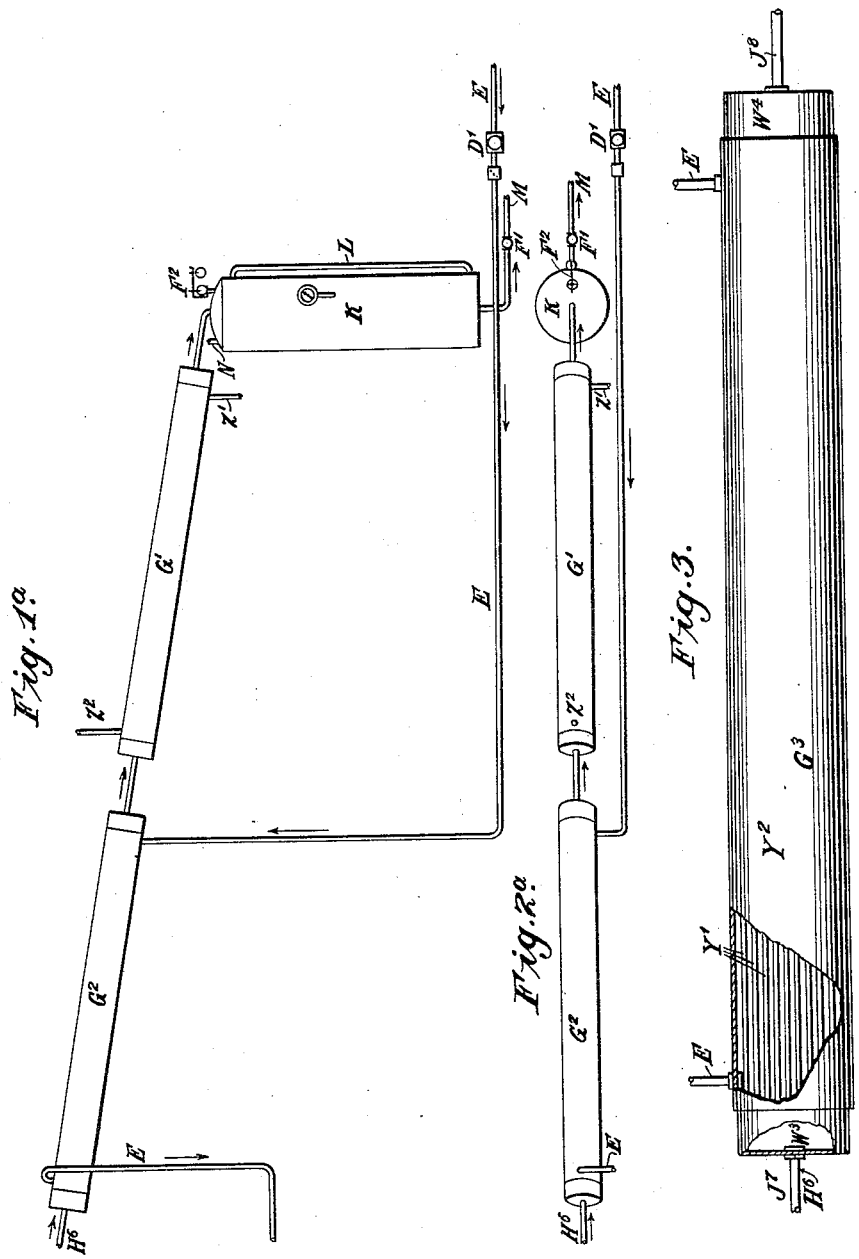
Figure 3:
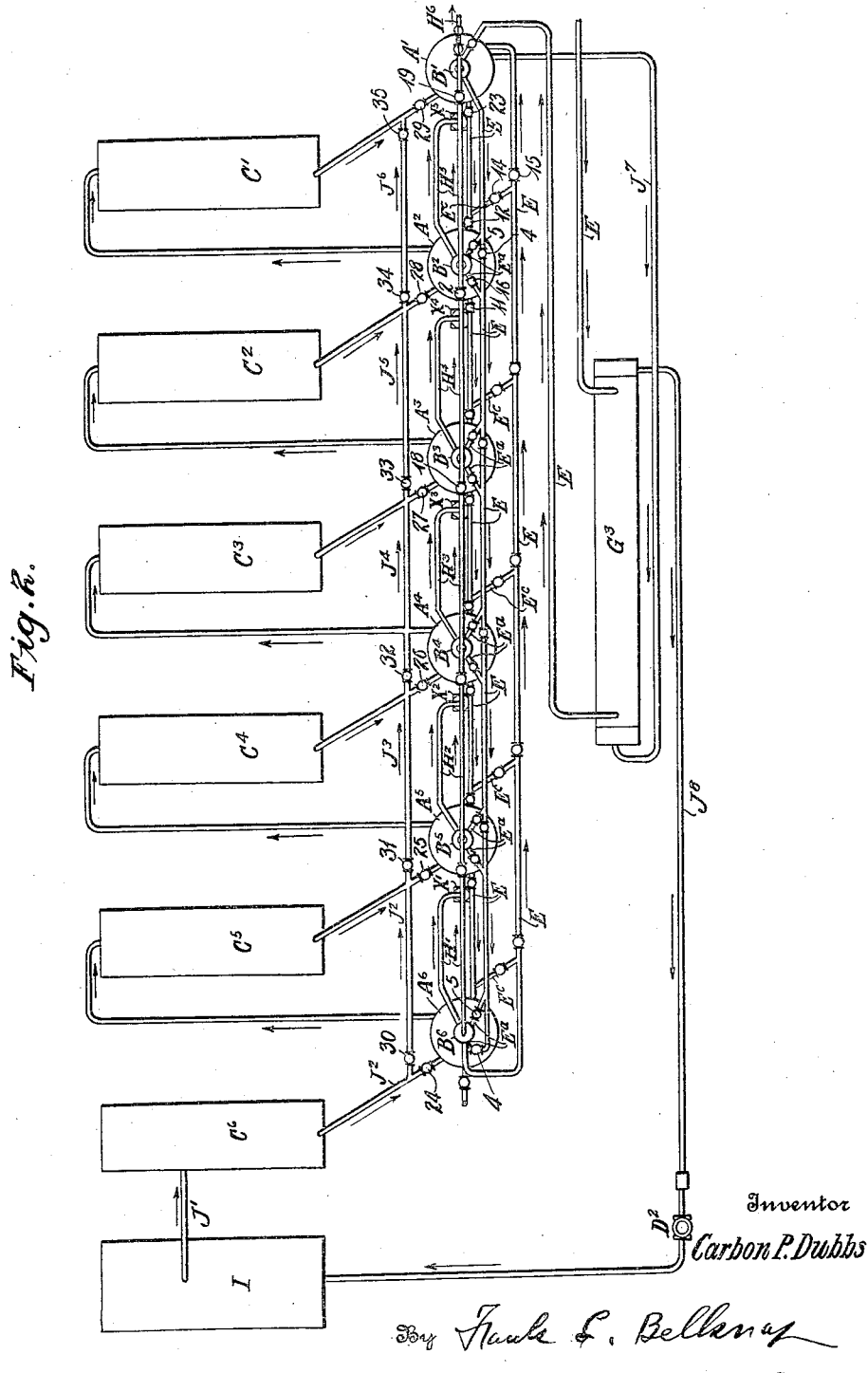
Fig. 3 is an enlarged side elevation, partly in section, of one of the heat interchangers.

Describing in detail the method with reference to the particular apparatus shown in the drawings, A—1, A—2, A—3, A—4, A—5 and A—6 designate the stills in which the petroleum or other hydrocarbons to be treated are subjected to the action of heat, it being understood that any number of stills may be used. G—2 designates a heat interchanger, by which more or less of the heat contained in the final vapors and gas distilled off is transmitted to the incoming supply of raw material.

In practice, the oil is pumped or fed through the line E, so as to go through the heat interchanger G—2, then out through the line E, to the heat interchanger G—3, from the latter heat interchanger, the oil passes through the line E to a series of reflux condensers marked B—1, B—2, B—3, B—4, B—5, and B—6, then through the pipe E into bottom of still A—1 the flow of the incoming charge of raw material being shown by the arrows positioned adjacent the pipe E or any other combination of the apparatus may be used that will accomplish the desired results, for instance, the raw material may be pumped directly into the heat interchanger G—3 and from there go directly into the bottom of any of the stills through the line E and branch lines E$^c$.

The raw material in the still A—1, is heated to drive off the vapors, the temperature depending, to a considerable extent, upon what product is desired. The vapors and gases generated in the still A—1, pass up through the reflux condenser B—1, in which the heaviest vapors condense and return to the still while the uncondensed vapors and gases pass through the pressure regulated valve F—3, and through the line H—6, into the heat interchanger G—2, and from there through the water condenser G—1, into a receiving tank K, sufficient pressure being maintained on this tank to force the distillate to any desired point and the gases generated to any desired point.

The residuum remaining in still A—1, overflows through pipe E—1, and enters the bottom of still A—2, which still is maintained at a higher heat, and the vapors and gases which are generated at a higher heat in this still pass up through the reflux condenser B—2, the heavier vapors being condensed and returned to the still A—2, while the lighter vapors and gases pass through vapor line H—5 and pump X—5 and discharge through pipe H, into the bottom of the still A—1, along with any condensed vapors, and percolate up through the oil contained in still A—1. The function of the pumps shown at X—1, X—2, X—3, X—4 and X—5, being to force the vapors along with any condensed portion of the vapors and incondensable gases, down through pipe H and out through the perforations in this pipe, into the bottom of the stills and thus faciliate the operation, these pumps may be of the spiral or rotary type of standard design and be operated by belt or by any of the other well known standard methods. The pumps themselves do not necessarily create a pressure on the apparatus, but are primarily for overcoming the pressure exerted against the vapors in pipe H created by the height of the column of liquid contained in the stills.

The residuum remaining in the still A—2 overflows through pipe E—1 into still A—3 at the bottom, still A—3 being maintained at a higher heat than the preceding still A—2. The vapors which are generated at the higher heat in still A—3, along with the gases, then pass up through reflux condenser B—3, the heavier portions of the vapors being condensed and returned to the still A—3, while the lighter vapors and gases pass through the line H—4 and pump X—4 to the bottom of still A—2 and are discharged along with any condensed vapors, through pipe H in the same manner as described with the preceding still.

The residuum remaining in still A—3 overflows through pipe E—1 into still A—4, the heat in this still being higher than in the preceding still. The same cycle of operation is then carried out for each still of the series so that by the time the residuum reaches the last still of the series, it will have been subjected to progressively increasing temperatures until the desired amount has been converted into the product desired. The residuum remaining in still A—6 is drawn off continuously or intermittently through the valve F—4 through pipe E—2 or through the valve shown on side of still near the top, such residuum being passed through heat interchangers similar to G—2 and thus preheating the incoming supply of raw material; such residuum is then rerun through the apparatus either with or without any previous treatment, or with or without being mixed with other material.

It will be noticed that the raw material in passing through the apparatus forms a pool in each still and is subjected to a progressively increasing temperature in the various stills while the vapors and gases given off have not only been made to percolate up through the liquid and caused to mix with the liquid in the zones of reaction; but have also been caused to travel in the reverse direction from the liquid so as to be subjected to progressively decreasing temperatures. This arrangement permits the vapors and gases to be subjected to comparatively high and low temperatures without excessive pressure, while the vapors in their final form, as they pass to the condenser, have been scrubbed through the liquid and their temperatures greatly reduced, so that as they pass from the still A—1 to the condenser, they are at a relatively low temperature compared to that at which they have been subjected to in the farthest still.

This novel apparatus will tend to prevent any heavy vapors, or such vapors which have not been sufficiently treated, from passing to the condenser since the stepdown in temperature, as the vapors and gases pass through the various stills toward the condenser, will tend to condense any heavy vapors and cause them to be carried back with the residuum and again subjected to the higher temperature. Another material advantage of this apparatus lies in the fact that the vapors and gases being stepped down in temperature by percolating through the liquid in the successive stills having lower temperatures, the heat units which are extracted in cooling the vapors and gases are transmitted to the liquid which is traveling in the reverse direction and is stepping up in temperature.

While any desired method of heating the stills may be employed such as the usual furnace or internal electric, I have in the drawings shown the stills as designed to be heated by steam. In detail, the steam heating arrangement comprises the boiler I, and a plurality of superheaters C—1, C—2, C—3, C—4, C—5 and C—6. The purpose of these superheaters is to permit the temperature in the various stills being independently regulated and maintained at the progressively higher temperature for the various stills. In operation, the steam is generated in the boiler 1, and passes through the steam line J—1, into the superheater C—6 and from there passes through pipe J—2 to the heating coils T, which are located in each of the stills. The steam is discharged through the pipe J—2 into the inlet manifold header W and then passes through the coils T to the outlet manifold W—1 from which it passes to the superheater C—5. Here the steam may be reheated to secure any predetermined temperature for the still A—5. Should the heat units given up by the vapors and gases percolating through any still be sufficient to maintain the desired temperature in that particular still, the steam can be by-passed entirely from such still or stills, or partially by-passed by means of partly or wholly closing valves marked 24, 25, 26, 27, 28 and 29, while partly or wholly opening valves 31, 32, 33, 34 and 35. The purpose of the arrangement is to permit the independent regulation of the temperature of any one or all of the stills, while utilizing to the highest degree, the heat units given up by the vapors and gases being cooled from heating the liquid in the various stills.

After the steam has been utilized for heating the various stills, its heat units are further conserved by transferring them into the incoming raw material by means of one or more heat interchangers G—3. The operation of this heat interchanger G—3 is as follows: Steam is admitted through the pipe J—7 into the inlet manifold header W—3 from which it passes through the pipes Y' to the outlet header W—4 from which it is returned through the pipe J—8 to the boiler 1.

In addition to the heat interchanger G—3, I preferably employ the heat interchanger G—2 in which the heat units of the vapor and gases as finally discharged from the still A—1, are transferred to the incoming raw material. If a further cooling of the resultant vapors is necessary, a water cooler having a water inlet Z—1 and a water outlet Z—2 is positioned around the portion of the pipe H—6, leading to the distillate and gas receiving tank K, from which the resultant products in both liquid and gaseous form are received and discharged to their respective storages.

Figure 4:
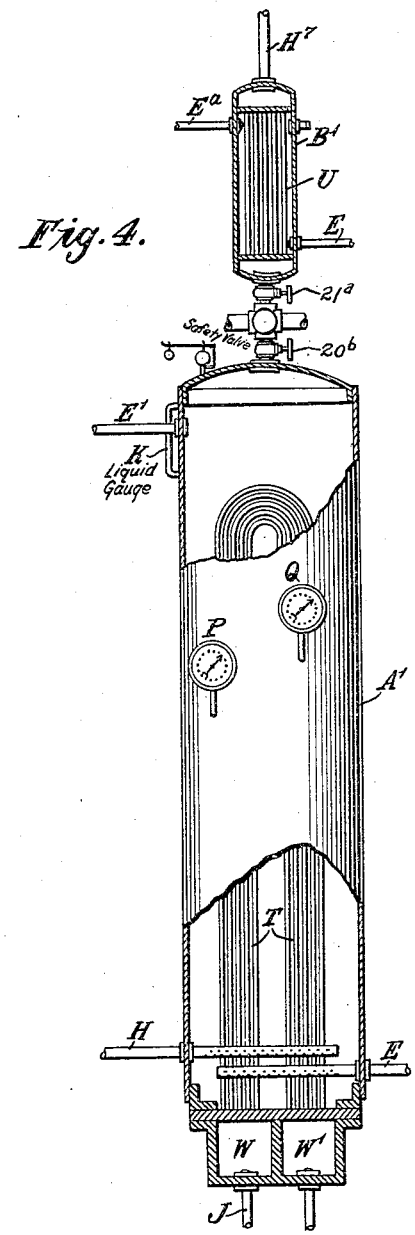
Fig. 4 is an enlarged side elevational view, partly in section, of one of the stills.

The reflux condensers are utilized as heat interchangers in that the oil coming from the pipe E is discharged into chamber surrounding the pipes U, Fig. 4, of the reflux condenser, and then pass out through the pipes E$a$ near the upper end. Thus the heat units extracted from the vapors are transferred to incoming raw material. The apparatus, however, is preferably arranged so any one or multiple of these reflux condensers can be used or by-passed. Also the vapor lines are so arranged that the vapors and gases can be by-passed from any one or any multiple of the reflux condensers or stills.

Also for convenience, in repairing or for other purposes, the apparatus should preferably be so constructed that any of the stills, heaters or condensers can be by-passed without in any way affecting the operation of the rest of the apparatus, suitable valves being provided. Any number of stills, reflux condensers, condensers, heat interchangers, etc., can be employed.

Valves 3, 5, 6, 7, 9, 11, 13, 15, 16, 17, 18, 20 and 23 are opened, while valves 2, 4, 8, 10, 12, 14, 19, 21, 22 and 34 are closed. The body of oil being treated passes as follows: The oil enters reflux condenser B', passes around the vapor pipes U in same, then out through pipe E$a$ and then through the succeeding reflux condensers in like manner, and from last reflux condenser, the oil enters still A' through perforated pipe in bottom of the still connected to pipe E, overflows through pipe E' to perforated pipe in still $A^2$ and so on through each succeeding still, and is drawn off from last still through valve $F^4$. If it is desired that the oil do not pass through any reflux condenser, to prevent the oil getting too hot, as for example, reflux condenser $B^2$, valves 5 and 16 would be closed while valve 4 would be open. If it is desired that the oil flowing from one still to the next succeeding still enter the top instead of the bottom of the succeeding still, as for example, enter the top of still $A^2$, then valve 13 would be closed and valves 11 and 12 opened and the oil would then flow into and out of the top of still $A^2$.

The vapors generated in the different stills normally are passed up through the reflux condensers and then forced down and into bottom of the next still through perforated pipe H, excepting still marked A', the vapors from which are carried to the final condensers and then condensed and collected separately. Any of the reflux condensers may be by-passed, as for example, reflux condenser $B^2$, by closing valves 6, 3 and 20 and opening valves 7 and 21.

The passage of the vapors can, of course, be so controlled that the vapors will all pass successively through the different retorts prior to their discharge into the initial stage retort A' from where they are delivered to the dephlegmator B'. This species of the invention is described and claimed in my Patent No. 1,440,772 issued January 2nd, 1923, and when the vapors are controlled in this manner, those generated in the last retort $A^6$ pass up through the pipe L', the valve $1^2$ being closed and the valve 2' being open, the valve 3' being likewise open, and the valves 4' and $4^2$ closed, causing the vapors to pass through the pump X' and the pipe $X^a$ into the preceding retort $A^5$ from which the vapors introduced to this retort after a slight condensation of the heavier constituents thereof and the vapors produced in the retort $A^5$ pass through the pipe controlled by the open valve 5' are prevented from entering the reflux condenser $B^5$ by the valve 6', pass through the pipe $h2$ through the open valve 7', down through the pipe $Z^a$ and into the retort $A^4$, the valves 8' and $8^2$ being closed. From the retort $A^4$ the vapors pass through the valve controlled pipe 10' the valve 9' being closed so that these vapors do not enter the dephlegmator $B^4$ passing, however, through the pipe $h3$ through the open valve 12' down through the pipe $Y^a$ into the retort $A^3$, it being apparent that the valves 11' and $12^2$ are closed. The vapors from the retort $A^3$ can then be passed through the pipe controlled by the valve 14', the valve 13' being closed, through the pipe $h^4$, the valve 10 being open, and the valves 8 and 9 closed down through the pump $X^4$ and into the retort $A^2$, from which retort all the vapors thus accumulating in the successive retorts $A^3$, $A^4$, $A^5$, $A^6$, pass through the pipe controlled by the valve 7, the valve 6 being closed, through the pipe $h^5$, the valve 21 being open and the valves 20 and 22 closed, thence from the pump $X^5$ into the retort $A'$. From this retort (by opening the valves $20^b$ and $21^a$) all the vapors may be subjected to their initial reflux treatment by passage through the reflux condenser $B'$, the condensate returning to the first or initial stage retort $A'$ for passage through the successive retorts to undergo retreatment. From the reflux condenser $B'$ the vapors pass out in the heretofore described manner through the pipe $H^7$ and the pipe $H^6$ for condensation and collection. It is therefore apparent that any or all of the reflux condensers can be cut out so that the vapors generated in one retort are not necessarily subjected to a reflux treatment before these vapors are introduced to a preceding retort, although such a treatment may be given whenever desirable. It is likewise apparent that if desired, by suitably controlling the valves hereinbefore described the vapors from each of the retorts $A'$ to $A^6$ inclusive can be subjected to individual reflux condensation in the reflux condensers $B'$ to $B^6$ inclusive, the reflux condensate from each condenser being returned to its still for retreatment, while the uncondensed vapors pass out through the lines $H^7$ into the feeding pipes $H^1$ to $H^5$ inclusive, and then on through the discharge pipe $H^6$ by controlling the valves shown disposed adjacent each section of the pipes $H^1$ to $H^5$ inclusive. Furthermore, as is clearly apparent, the vapors from each still can be subjected to individual reflux treatment, the reflux being returned while the uncondensed vapors pass on successively through the succeeding retorts in the series and through the succeeding reflux condensers. This is accomplished where vapors are passing from the retort $A^6$ into the reflux condenser $B^6$, the reflux returning to the still $A^6$, while the uncondensed vapors pass out by the pipe line $H'$ in the direction of the arrow down to the pump $X'$ and into the next retort $A^5$ where said vapors, with other vapors produced from the oil in this retort, may pass through reflux condenser $B^5$, the reflux being returned, while the uncondensed vapors pass on through line $H^2$ and pump $X^2$ into the next retort $A^4$, this, of course, continuing until the vapors have passed through the entire apparatus.

From the above description, it will be apparent that the raw material is first preheated by the heat units extracted in cooling the heated vapors and gases, second, that the material treated is progressively subjected to increasing temperatures while maintaining any desired pressure on the vapors generated, and that the resultant vapors are caused to travel in the reverse direction, that is, through progressively decreasing temperatures, while caused to percolate up through the liquid so that the liquid, vapors and gases are present in the zones of reaction, and the vapors and gases progressively advanced towards the still or through a portion of the apparatus having a lower temperature. The temperature to which the oil is heated may vary during the process from a minimum of 200 degrees F. to 2000 degrees F. The pressure may vary from a minimum of 50 pounds to the square inch to a maximum of 1000 pounds to the square inch.

While I have shown and described a particular apparatus for carrying out my method, the latter is not limited to use with the particular apparatus shown and described. Also various changes in the details of construction and connections and operations of the apparatus can be made within the scope of my invention.

I claim as my invention:

1. An apparatus for cracking oil comprising a plurality of retorts adapted to each receive bulk supplies of oil, means for connecting said retorts in series whereby the oil successively passes through said series of retorts, means for heating the oil to a cracking temperature in said retorts, a dephlegmator for each retort, means for discharging the vapors generated in each retort to its dephlegmator and for returning reflux condensate to the retort from which the vapors were discharged, means for passing the uncondensed vapors from said dephlegmators successively through other retorts in the series, and means for maintaining a superatmospheric pressure on the oil undergoing distillation.

2. An apparatus for cracking oil comprising a plurality of retorts adapted to each receive bulk supplies of oil, means for connecting said retorts in series whereby the oil successively passes through said series of retorts, means for heating the oil to a cracking temperature in said retorts, a dephlegmator for each retort, means for discharging the vapors generated in each retort to its dephlegmator and for returning reflux condensate to the retort from which the vapors were discharged, means for passing the uncondensed vapors from said dephlegmators successively through other retorts in the series whereby the vapors percolate through oil bodies in said retorts, means for finally discharging said vapors, and means for maintaining a superatmospheric pressure on said oil during distillation.

In testimony whereof I affix my signature.

CARBON P. DUBBS.